(12) United States Patent
Goy et al.

(10) Patent No.: US 10,858,939 B2
(45) Date of Patent: Dec. 8, 2020

(54) GEAR PUMP BEARINGS

(71) Applicant: Hamilton Sundstrand Corporation, Charlotte, NC (US)

(72) Inventors: Edward W. Goy, Crystal Lake, IL (US); Joseph Wetch, Roscoe, IL (US); Ryszard Czeslaw Wlaznik, Rockford, IL (US); Ernest W. Samotshozo, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/041,621

(22) Filed: Jul. 20, 2018

(65) Prior Publication Data

US 2020/0024947 A1    Jan. 23, 2020

(51) Int. Cl.
*F16C 17/02* (2006.01)
*F01C 21/02* (2006.01)
*F16C 33/12* (2006.01)
*F04C 2/12* (2006.01)
*F04C 2/18* (2006.01)

(52) U.S. Cl.
CPC .............. *F01C 21/02* (2013.01); *F16C 17/02* (2013.01); *F16C 33/12* (2013.01); *F04C 2/123* (2013.01); *F04C 2/18* (2013.01); *F04C 2240/50* (2013.01); *F16C 2226/62* (2013.01); *F16C 2360/00* (2013.01)

(58) Field of Classification Search
CPC ...... F01C 21/02; F16C 33/12; F16C 2226/62; F16C 35/092; F16C 2360/00; F16C 17/02; F16C 17/12; F16C 17/26; F04C 2240/50; F04C 2/123; F04C 2/18; F04C 15/0026; F04C 2/08; F04C 15/00; F04C 15/0023; F04C 2240/51; F04C 2240/52; F04C 2240/54; F04C 2240/56

See application file for complete search history.

(56) References Cited

U.S. PATENT DOCUMENTS

| | | | | |
|---|---|---|---|---|
| 3,169,040 A | * | 2/1965 | Ryon | F16C 35/067 384/537 |
| 3,427,984 A | * | 2/1969 | Slevin | F04C 15/0026 418/104 |
| 4,124,335 A | * | 11/1978 | Jons | F04C 15/0019 418/132 |
| 4,336,006 A | * | 6/1982 | Grabow | F04C 2/086 418/131 |

(Continued)

FOREIGN PATENT DOCUMENTS

EP    2868925 A1    5/2015
JP    2002013485 A    1/2002

OTHER PUBLICATIONS

Extended European search report issued in corresponding EP Application No. 19187379.3 dated Oct. 24, 2019.

*Primary Examiner* — Alan B Waits
(74) *Attorney, Agent, or Firm* — Locke Lord LLP; Daniel J. Fiorello; Scott D. Wofsy

(57) ABSTRACT

A gear pump bearing can include a body sized and shaped to occupy a portion of a pump housing cavity such that a clearance is formed between the body and a pump housing. The gear pump bearing can also include at least one clearance consuming feature extending from an outer surface of the body configured to reduce motion of the body within the pump housing cavity.

14 Claims, 3 Drawing Sheets

(56) References Cited

U.S. PATENT DOCUMENTS

| | | | |
|---|---|---|---|
| H242 H * | 4/1987 | Eng | 29/525 |
| 4,682,938 A * | 7/1987 | Riordan | F04C 2/086 |
| | | | 29/557 |
| 5,624,251 A * | 4/1997 | Negrini | F04C 15/0042 |
| | | | 418/206.1 |
| 6,390,793 B1 * | 5/2002 | Sweet | F04C 15/0026 |
| | | | 418/132 |

* cited by examiner

GEAR PUMP BEARINGS

BACKGROUND

1. Field

The present disclosure relates to gear pumps, more specifically to bearings for gear pumps.

2. Description of Related Art

Gear pumps require tight clearances around the bearings and gears within a housing bore in order to function efficiently. The traditional way of achieving tight clearances is to lap the bearings to fit the housing. This is a very expensive process. To reduce costs, certain modern pumps use controlled center distances and live with larger clearances and larger internal leakages, which causes reduced volumetric efficiencies.

Such conventional methods and systems have generally been considered satisfactory for their intended purpose. However, there is still a need in the art for improved gear pump bearings. The present disclosure provides a solution for this need.

SUMMARY

A gear pump bearing can include a body sized and shaped to occupy a portion of a pump housing cavity such that a clearance is formed between the body and a pump housing. The gear pump bearing can also include at least one clearance consuming feature extending from an outer surface of the body configured to reduce motion of the body within the pump housing cavity.

The at least one clearance consuming feature can be or include at least one pin disposed on or within the body. The at least one pin can include a plurality of pins disposed at different circumferential positions on the body.

In certain embodiments, the plurality of pins includes two pins. The plurality of pins can be inserted into a respective pin hole defined in the body. In certain embodiments, the plurality of pins can be epoxied to the body (e.g., in each pin hole).

In certain embodiments, the pins are disposed about 45 degrees apart. However, any other suitable relative position is contemplated herein.

The at least one clearance consuming feature can be or include a raised outer diameter extension (e.g., integrally formed with the body, or otherwise attached). For example, the at least one clearance consuming feature can be a bump shape extending from the outer surface of the body. Any suitable number and/or shape of raised outer diameter extensions are contemplated herein.

The bearing can include an inner aperture defined in the body for receiving a shaft of a gear. In certain embodiments, the bearing can include a flat configured to mate with a flat of mating gear bearing within the pump housing cavity. In certain embodiments, the outer surface can be partially circular having a first radius, wherein pump housing cavity is partially circular having second radius, wherein first radius is smaller than second radius.

In accordance with at least one aspect of this disclosure, a gear pump can include a pump housing defining a pump housing cavity, an inlet, and an outlet. The gear pump can include a plurality of gear bearings disposed within the pump housing cavity, at least one of the gear bearings (e.g., all) including any suitable embodiment of a bearing in accordance with this disclosure (e.g., as described above). The gear pump can also include a plurality of gears disposed within pump housing cavity, each gear rotatably mounted between and in contact with a pair of the plurality of gear bearings. The gears and the gear bearings can be disposed within the pump housing in a pumping relationship to cause pumping action between the inlet and the outlet when the gears are rotated.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
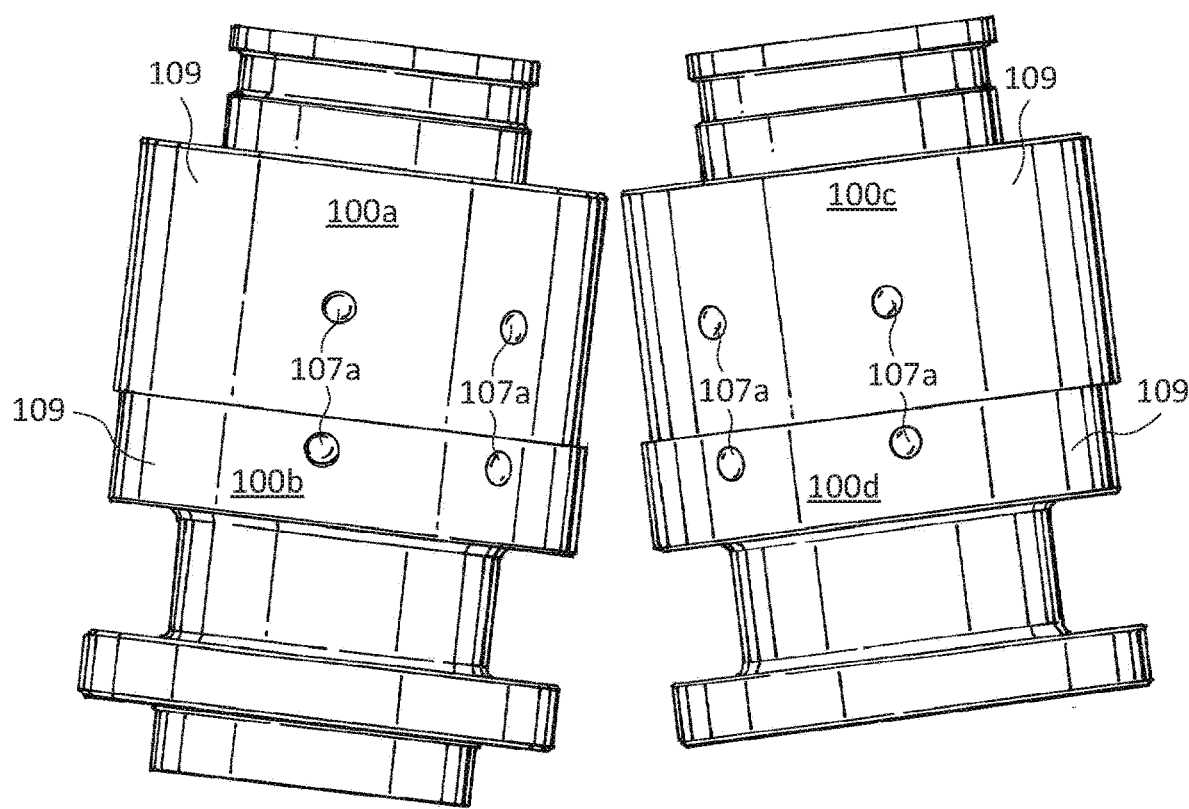
FIG. 1 is a perspective view of embodiments of gear pump bearings in accordance with this disclosure, showing two pairs of bearings for use in a single gear pump.
Figure 2:
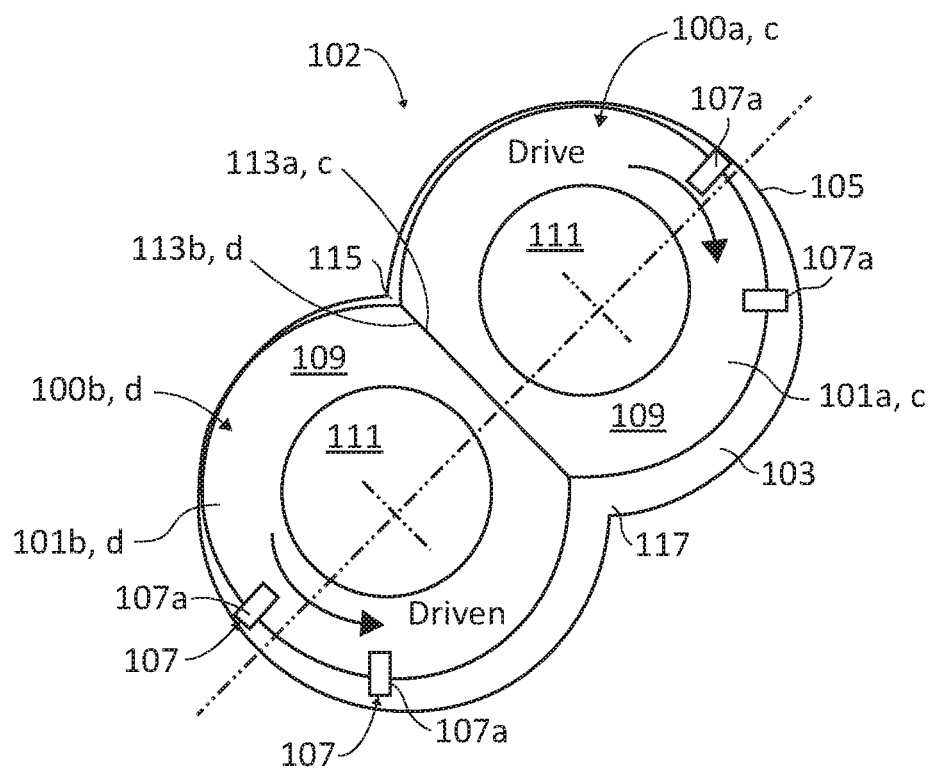
FIG. 2 is a cross-sectional schematic view of a gear pump in accordance with this disclosure, showing a pair of pump bearings, as shown in FIG. 1, mated at flats thereof within a gear pump cavity.
Figure 3:
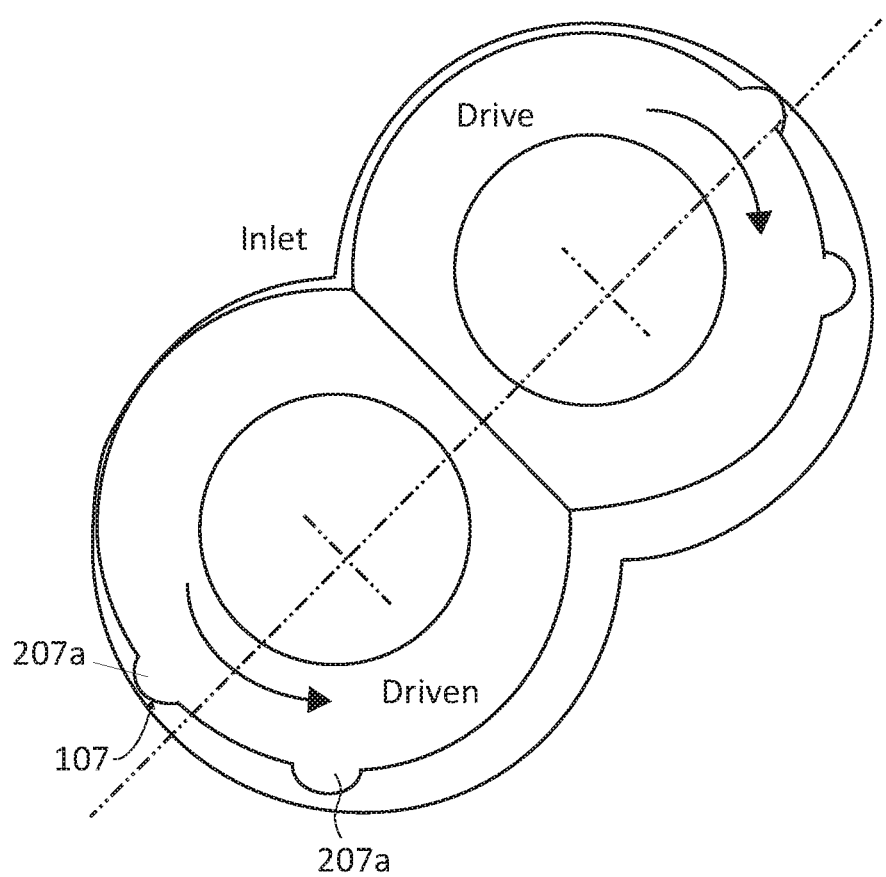
FIG. 3 is a cross-sectional schematic view of a gear pump in accordance with this disclosure, showing another embodiment of a pair of pump bearings mated at flats thereof within a gear pump cavity.

Reference will now be made to the drawings wherein like reference numerals identify similar structural features or aspects of the subject disclosure. For purposes of explanation and illustration, and not limitation, an illustrative view of embodiments of gear pump bearings in accordance with the disclosure is shown in FIG. 1 and is designated generally by reference characters 100*a*, 100*b*, 100*c*, and 100*d*. Other embodiments and/or aspects of this disclosure are shown in FIGS. 2 and 3. The systems and methods described herein can be used to improve gear pump efficiency, for example.

Referring to FIGS. 1 and 2, a gear pump bearing 100*a*, 100*b*, 100*c*, 100*d*, can include a body 101*a, b, c, d* sized and shaped to occupy a portion of a pump housing cavity 103 such that a clearance (a gap) is formed between the body 101*a, b, c, d* and a pump housing 105 as shown. The gear pump bearing 100*a, b, c, d* can also include at least one clearance consuming feature 107 extending from an outer surface 109 of the body 101*a, b, c, d* configured to reduce motion of the body 101*a, b, c, d* within the pump housing cavity 103.

The at least one clearance consuming feature 107 can be or include at least one pin 107*a* disposed on or within the body 101*a, b, c, d* as shown in FIGS. 1 and 2. The at least one pin 107*a* can include a plurality of pins 107*a* disposed at different circumferential positions on the body 101*a, b, c, d*, also as shown in FIGS. 1 and 2.

In certain embodiments, the plurality of pins 107*a* includes two pins 107*a* (e.g., as shown in FIGS. 1 and 2. Any other suitable number of pins 107*a* is contemplated herein.

The plurality of pins 107*a* can be inserted into a respective pin hole defined in the body 101*a, b, c, d*. In certain embodiments, the plurality of pins 107*a* can be epoxied to the body 101a, b, c, d (e.g., in each pin hole), or attached to the body 101a, b, c, d in any other suitable manner.

In certain embodiments, the pins 107a are disposed about 45 degrees apart, e.g., as shown. However, any other suitable relative position is contemplated herein.

Referring to FIG. 3, In certain embodiments, the at least one clearance consuming feature 107 can be or include at least one raised outer diameter extension 207a (e.g., integrally formed with the body 101a, b, c, d, or otherwise attached). For example, the at least one raised outer diameter extension 207a can be a bump shape extending from the outer surface 109 of the body 101a, b, c, d. Any suitable number and/or shape of raised outer diameter extensions 207a are contemplated herein.

Referring to FIG. 2, the bearing 100a, b, c, d can include an inner aperture 111 defined in the body 101a, b, c, d for receiving a shaft of a gear for example. In certain embodiments, the bearing 100a, c can include a flat 113a, c configured to mate with a flat 113b, d of mating gear bearing 100b, d within the pump housing cavity 103.

In certain embodiments, the outer surface 109 can be partially circular having a first radius, and the pump housing 105 and/or the cavity 103 is partially circular having second radius. The first radius can be smaller than second radius which can create the clearance between the outer surface 109 and the housing 105.

In accordance with at least one aspect of this disclosure, a gear pump 102 can include a pump housing 105 defining a pump housing cavity 103, an inlet 115, and an outlet 117. The gear pump 102 can include a plurality of gear bearings (e.g., 100a, b, c, d) disposed within the pump housing cavity 103, at least one of the gear bearings (e.g., all) including any suitable embodiment of a bearing (e.g., 100a, b, c, d) in accordance with this disclosure (e.g., as described above).

The gear pump 102 can also include a plurality of gears (not shown) disposed within pump housing cavity 103. As appreciated by those having ordinary skill in the art, each gear can be rotatably mounted between and in contact with a pair (e.g., 100a and 100b or 100c and 100d) of the plurality of gear bearings. The gears and the gear bearings can be disposed within the pump housing 105 in a pumping relationship to cause pumping action between the inlet 115 and the outlet 117 when the gears are rotated. The gears can be sandwiched between two halves which can form hydraulic journal bearings.

In embodiments, one or more pins or any other suitable features that extend from the outer surface 109 can consume outer diameter clearances and increase pump efficiency. Embodiments minimize bearing motion due to gear friction. Certain embodiments include one or more pins or other suitable features that occupy the clearance, and will only contact the housing in certain operations. In certain embodiments, the one or more pins or other suitable features can rest about 0.002 inches from the housing.

In certain embodiments, a method can include drilling one or more pin holes in the body of the bearings, optionally adding an epoxy in the one or more pin holes, and then inserting a pin into each pin hole. The method can optionally include grinding down the pin to a desired size. Another method can include additively manufacturing or milling a gear bearing to include an outer diameter extension that is integral with the body.

In traditional pumps, bearing halves can move away from each other at the mating flats, and/or away from the inlet wall. Embodiments prevent such motion without increasing the overall size of the bearing outer diameter. By installing one or more pins or having other one or more other suitable features at a certain point or points, the cost of manufacturing and maintenance of bearings are reduced by eliminating a need for lap-to-fit clearances. Reduced manufacturing costs and improved volumetric efficiencies of gear pumps are realized by achieving tight internal clearances and small internal parasitic leakages.

Any suitable combination(s) of any disclosed embodiments and/or any suitable portion(s) thereof are contemplated herein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A gear pump bearing, comprising:
 a body sized and shaped to occupy a portion of a pump housing cavity such that a clearance is formed between the body and a pump housing; and
 at least one clearance consuming feature extending from an outer surface of the body configured to reduce motion of the body within the pump housing cavity, wherein the at least one clearance consuming feature includes a plurality of pins disposed on or within the body at different circumferential positions on the body.

2. The bearing of claim 1, wherein the plurality of pins includes two pins.

3. The bearing of claim 2, wherein the plurality of pins are inserted into a respective pin hole defined in the body.

4. The bearing of claim 3, wherein the plurality of pins are epoxied to the body.

5. The bearing of claim 2, wherein the pins are disposed about 45 degrees apart.

6. The bearing of claim 1, wherein the at least one clearance consuming feature further includes at least one raised outer diameter extension.

7. The bearing of claim 1, further comprising an inner aperture defined in the body for receiving a shaft of a gear.

8. The bearing of claim 1, wherein the bearing includes a flat configured to mate with a flat of mating gear bearing within the pump housing cavity.

9. The bearing of claim 1, wherein the outer surface is partially circular having a first radius, wherein pump housing cavity is partially circular having a second radius, wherein first radius is smaller than second radius.

10. A gear pump, comprising:
 a pump housing defining a pump housing cavity, an inlet, and an outlet;
 a plurality of gear bearings disposed within the pump housing cavity, at least one of the gear bearings comprising:
  a body sized and shaped to occupy a portion of the pump housing cavity such that a clearance is formed between the body and a pump housing; and at least one clearance consuming feature extending from an outer surface of the body configured to reduce motion of the body within the pump housing cavity; and a plurality of gears disposed within pump housing cavity, each gear rotatably mounted between and in contact with a pair of the plurality of gear bearings, wherein the gears and the gear bearings are disposed within the pump housing in a pumping relationship to cause pumping action between the inlet and the outlet when the gears are rotated, wherein the at least one clearance consuming feature includes a plurality of raised outer diameter extensions disposed at different circumferential positions on the body, wherein the at least one clearance consuming feature includes at least one pin disposed on or within the body, wherein the at least one pin includes a plurality of pins disposed at different circumferential positions on the body.

11. The pump of claim 10, wherein the plurality of pins includes two pins.

12. The pump of claim 11, wherein the plurality of pins are inserted into a respective pin hole defined in the body.

13. The pump of claim 12, wherein the plurality of pins are epoxied to the body.

14. The pump of claim 11, wherein the pins are disposed about 45 degrees apart.

* * * * *